March 25, 1952     H. R. ZIEBELL     2,590,595
GAFF HOOK
Filed Oct. 18, 1947

INVENTOR
HARVEY R. ZIEBELL
BY
ATTORNEYS

Patented Mar. 25, 1952

2,590,595

UNITED STATES PATENT OFFICE 2,590,595

GAFF HOOK

Harvey R. Ziebell, Oshkosh, Wis.

Application October 18, 1947, Serial No. 780,703

2 Claims. (Cl. 294—26)

This invention appertains to fishing appliances and more particularly to a folding collapsible device for facilitating the landing of fish.

One of the primary objects of my invention is to provide a fishing appliance embodying an elongated handle having pivotally connected thereto the fish engaging member, whereby said member can be swung outward to an operative, extended position in longitudinal alignment with the handle or back alongside the handle to a collapsed out of the way inoperative position.

Another salient object of my invention is to provide a device for landing fish, in which the handle is of a light hollow, water-tight construction to form a float, whereby should the device be inadvertently dropped overboard, the same will float and thereby prevent the loss of said device.

A further important object of my invention is to provide a fishing appliance of the above character, which can be quickly locked rigidly against movement in its operative, extended position, so that the implement can be effectively used.

A still further object of my invention is to provide a fishing appliance embodying a light tubular handle closed and sealed at its rear end by a suitable cap and closed and sealed at its forward end by a novel head, which in turn pivotally supports and locks the fish engaging member.

A still further important object of my invention is to provide a fish appliance of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing:

Figure 1:
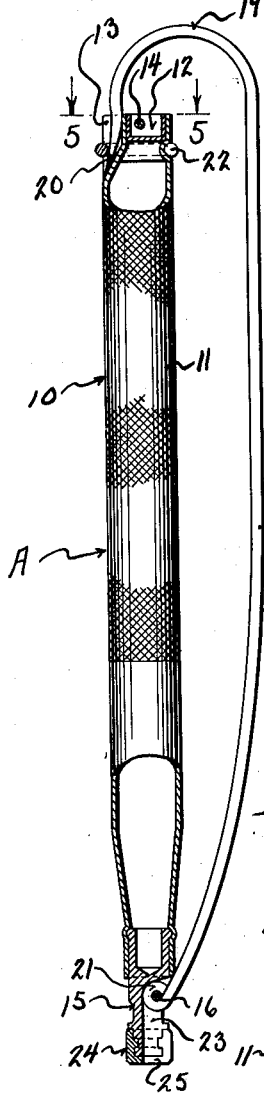
Figure 1 is a side elevational view of my improved fishing appliance, showing the same in its collapsed, inoperative position, parts of the figure being shown broken away and in section to illustrate structural detail.

Referring to the drawing in detail, wherein similar reference characters designate corresponding parts throughout the several views, the letter A generally indicates my novel fishing appliance for facilitating the landing of fish. In the present illustration, I have shown the appliance in the form of a gaff hook, but the handle can carry a net in lieu of the hook.

As illustrated, my appliance comprises a handle 10. The handle is of a novel construction, which will now be described in detail. The handle 10 is of an elongated form and includes a light tubular shell 11 formed from aluminum, or the like. The rear end of the shell 11 has fitted therein an end cap 12, so as to completely close and seal this end. In one form of the invention, the rear end of the shell 11 is pressed inwardly to form a seat 13, the purpose of which will later appear. It is to be noted that the end cap 12 is also pressed in with the shell to form this seat. A rivet 14 can extend across the end cap 12, not only for the purpose of holding the end cap in position but to also permit the attaching of a cord or snap hook to the device.

The forward end of the tubular shell receives a novel head 15, and this head is inserted part way in the shell, and the shell is then drawn and pressed tight around said head in sealing contact therewith. The head 15 then projects forwardly of the handle. By this construction a water-tight, light handle is provided, which forms a float for the entire appliance. Pivotally connected to the head beyond the handle by means of a pivot pin 16 is the gaff hook 17. This gaff hook 17 includes a resilient shank 18. The outer end of the shank is curved to provide a bight or hook portion 19, and the outer end thereof is tapered and sharpened as at 20 to provide a penetrating point. This point can extend slightly in an outward path. The rear end of the shank is coiled to provide an eye 21, and the pivot pin extends through the eye 21 and the head 15 as previously set forth. When the hook 17 is not in use, the same is swung rearwardly of the handle on the pivot pin 16, and the shank of the hook is flexed so that the bill or point 20 will snap into the seat 13. The tension is such that the point or bill will normally be held in the seat. If desired, an open ring 22 can be rotatably mounted on the rear end of the handle. The ring can be turned so as to register the opening therein with the socket to permit the bill or point 20 to ride into the socket. The ring can then be turned a slight distance so that the opening will be moving past the bill to hold the bill in the socket or seat against accidental displacement.

Figure 2:
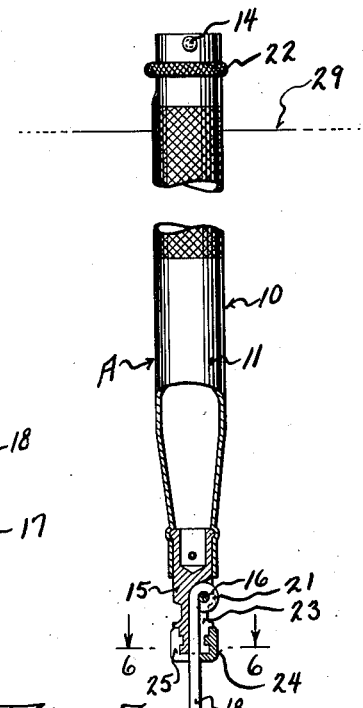
Figure 2 is a view similar to Figure 1 but showing the appliance in its operative extended position, the view also illustrating the water line should the appliance be inadvertently dropped in the water.
Figure 3:
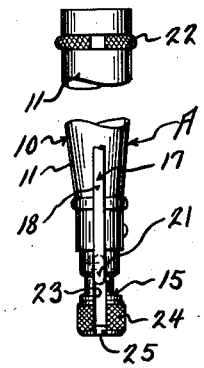
Figure 3 is a side elevational view looking at right angles to Figure 1 of the drawing and showing the appliance in its collapsed, inoperative position.
Figure 4:
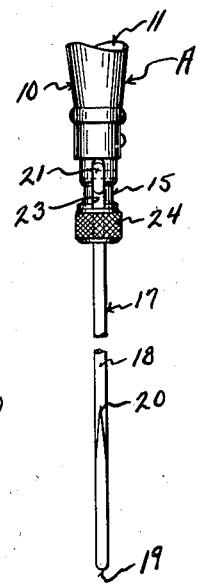
Figure 4 is a fragmentary, side elevational view taken at right angles to Figures 1 and 2 and showing the appliance in its extended, operative position.

The head 15 beyond the handle is provided with a longitudinal groove 23, and the width of the groove corresponds substantially to the diameter of the shank 18 of the gaff hook. Consequently, when the gaff hook is swung to its extended, operative position, as shown in Figure 2, the shank will ride into the groove so that the shank will be substantially in longitudinal alignment with the axial longitudinal center of the handle.

Rotatably mounted on the extreme forward end of the head 15 is a sleeve 24. This sleeve is provided with a slot 25, and by turning the sleeve, the slot can be moved into registration with the groove 23 in the head 15. At this time, the shank 18 can be swung into the groove 23, and after the shank is seated in the groove, the sleeve can be turned so that the slot 25 will be out of alignment with the groove. This will effectively lock the shank in its extended position, and the sleeve will brace the shank adjacent to pivot 16.

In the making of my device, the sleeve can be in the nature of an open ring and can be sprung on the head and then brought comparatively tight around said head so that only the slot 25 will be formed.

Figure 7:
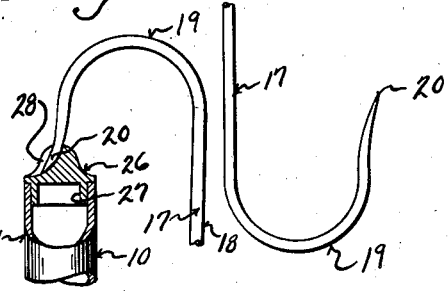
Figure 7 is a fragmentary, side elevational view partly in section, showing a slight modified form of closure cap for the rear end of the handle.
Figure 5:
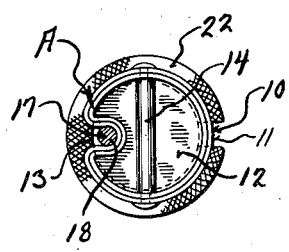
Figure 5 is an enlarged, fragmentary, detail, sectional view taken substantially on the line 5—5 of Figure 1, looking in the direction of the arrows.
Figure 6:
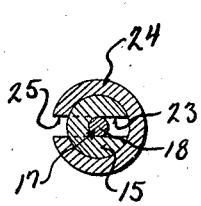
Figure 6 is an enlarged, fragmentary, detail, transverse, sectional view taken on the line 6—6 of Figure 2 looking in the direction of the arrows and illustrating the locking mechanism.

In Figure 7, I have shown a slightly modified form of end cap for the handle 10. In this form I utilize an end cap 26 having an annular skirt 27 which is fitted tight in the shell 11. A portion of the cap extends beyond the shell 11 and has formed therein a groove 28 which constitutes a seat for the bill or point 20 of the gaff hook.

In Figure 2, I have shown a line indicated by the reference character 29, and this indicates a water line. If the device is inadvertently dropped in the water, the same will float, and the rear end of the handle will protrude above the water the distance shown in Figure 2.

From the foregoing description, it can be seen that I have provided a device for landing fish which will not only fold to a collapsed position, so that the same will occupy a small compass whereby the same can be readily stored away in a tackle box or the like, but which will also be buoyant and light to handle.

Much stress is laid on the fact that the hook portion of the device can be quickly swung to its extended operative position and then locked in place.

Various changes in details can be made without departing from the spirit or the scope of my invention, but what I claim as new is:

1. A gaff hook comprising a handle having a forwardly projecting terminal provided with a longitudinally extending groove, a shank having a hinge barrel on its inner end fitted in the rear end of said groove, a bight portion and bill on its forward end, a pivot pin extending through the hinge barrel and the forwardly projecting terminal, said shank being movable in the groove, and means carried by the extended portion for locking the shank in said groove.

2. A gaff hook comprising a handle having a forwardly projecting terminal provided with a longitudinally extending groove, a shank having a hinge barrel on its inner end fitted in the rear end of said groove, a bight portion and bill on its forward end, a pivot pin extending through the hinge barrel and the forwardly projecting terminal, said shank being movable in the groove, and means carried by the extended portion for locking the shank in said groove, said means consisting of a sleeve rotatably carried by said extended portion having a slot movable into and out of alignment with the groove.

HARVEY R. ZIEBELL.

REFERENCES CITED

The following references are of record in the file of this patent:

UNITED STATES PATENTS

| Number | Name | Date |
| --- | --- | --- |
| 752,550 | Heritage | Feb. 16, 1904 |
| 895,126 | Thomson | Aug. 4, 1908 |
| 1,302,457 | Ureck | Apr. 29, 1919 |
| 2,214,660 | Darling | Sept. 10, 1940 |